April 8, 1952     C. B. GALLANT     2,592,022
DEVICE FOR USE IN PROTECTING
BUILDINGS AGAINST TERMITES
Filed Aug. 10, 1945
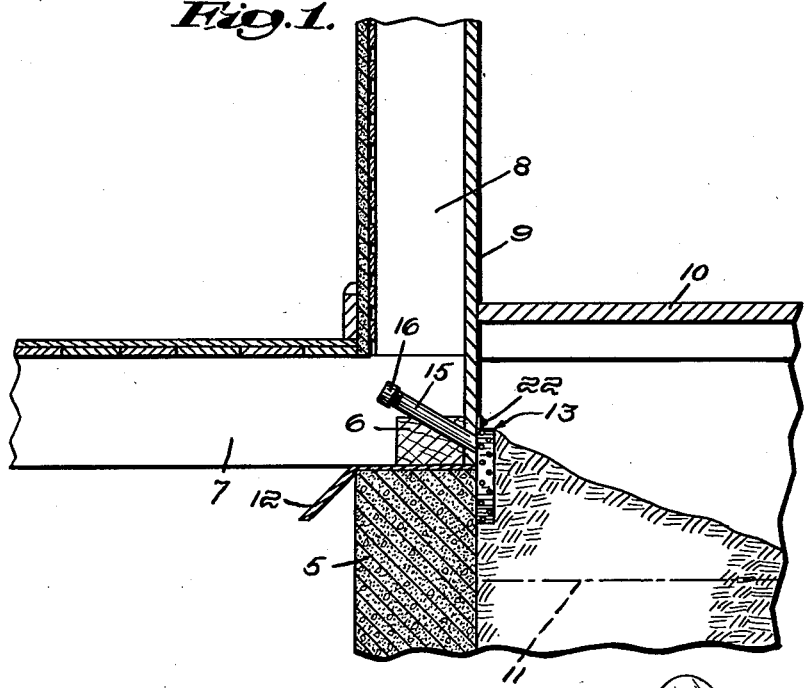
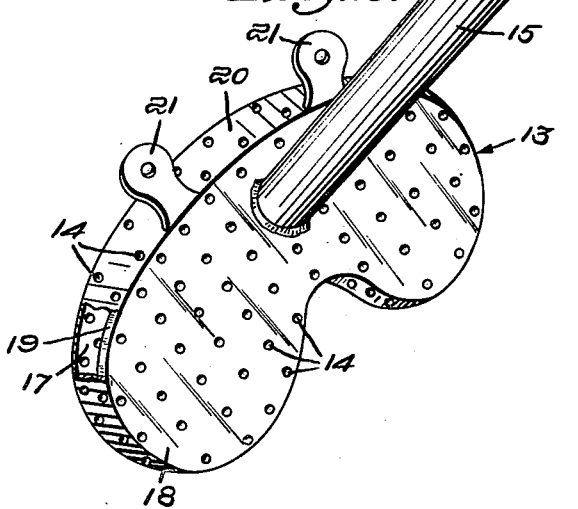
Inventor:
Charles B. Gallant,
By Spear+Spear
Attorneys Patented Apr. 8, 1952

2,592,022

UNITED STATES PATENT OFFICE 2,592,022

DEVICE FOR USE IN PROTECTING BUILDINGS AGAINST TERMITES

Charles Benjamin Gallant, Newtonville, Mass., assignor to Gallant Termite Barrier, Inc., a corporation of Massachusetts Application August 10, 1945, Serial No. 609,983

3 Claims. (Cl. 43—131)

My present invention relates to devices for use in protecting the wooden parts of buildings against termites and the like and is a continuation-in-part of my now abandoned application, Serial No. 545,678, filed July 19, 1944.

It is well established that annually termites cause very extensive damage to buildings. Efforts to protect buildings against them have demonstrated that a building may be safeguarded by the use of a shield interposed between the foundation and the wooden parts of the wall structure where the foundation extends above the ground.

The use of steps, porches, and terraces limit the effectiveness of such shields as the sill, framework, or other wooden parts of the wall structure commonly extend into the ground in the area of steps, porches and terraces and the dirt is covered with brick, stone, or a cement surface. Zones are thus established where termites may readily pass over any shield to attack the wood with the result that steps, porches, and terraces establish areas in which ideal conditions exist for the termites.

Such areas can be protected only by the periodic treatment of the soil with a substance toxic to termites to maintain a zone in which termites cannot survive and it is to the provision of efficient and inexpensive devices for use in maintaining the soil in such a condition that my invention is particularly directed.

In accordance with my invention, I provide a device which is adapted to be buried in the ground adjacent the wooden parts of the wall structure that extend into the ground. The device consists of a container having a plurality of apertures through which the toxic substance may escape from the container and be distributed over a sufficiently wide area to establish a protective zone in which termites cannot live. Connected to each container is a filler tube preferably adapted to extend through the wall structure to permit the container to be filled periodically from the interior of the building.

In the accompanying drawings, I have shown an illustrative embodiment of my invention from which its novel features and advantages will be readily apparent.

In the drawings:

Fig. 1 is a view showing a device in accordance with my invention in a typical installation, and Fig. 2 is a perspective view of the device of Fig. 1 partly broken away to show its construction.

In Fig. 1 of the drawings, I have indicated at 5 a typical foundation supporting a sill 6, stringers 7, and uprights 8 to which any wall structure 9 may be attached. I have shown a step 10 as illustrative of the problem, in termite control, where steps, porches, and terraces are used. Commonly, such structures involve the building up of the ground above its normal level, suggested at 11, so that some wooden part of the building extends into the ground.

I have shown at 12 a termite shield interposed between the foundation 5 and the sill and stringers. Such a shield is an effective barrier against termites when it is above the ground, but as will be apparent from Fig. 1, where buried in the dirt, it affords no protection against termites. As a rule, the ground adjacent a building may be poisoned to provide effective protection against termites by periodically pouring thereon a toxic liquid. Where, however, the ground is cement covered, it is impossible to poison the soil without breaking the cement to permit the poison where needed and it is the provision of means to enable cement covered areas to be periodically treated that my invention is particularly directed.

As shown most clearly in Fig. 2, my device consists of a container generally indicated at 13 and having in its walls a plurality of perforations 14 so small as effectively to prevent from entering the container any material amount of the soil in which the container is buried and to insure dispersion of the toxic liquid throughout a wide area of the soil surrounding the container. Connected to the container 13 is a filler pipe 15 closed at its upper end by a removable cap 16.

The container 13 may conveniently consist of front and back walls 17 and 18 each of which has an inturned edge 19 to establish a flange to which the strip 20 is attached to complete the container. The back wall 18 may be formed with a pair of ears 21 apertured to receive attaching nails or screws shown at 22 in Fig. 1.

The filler pipe 15 extends preferably from the rear wall 18 diagonally upwardly through the wall structure so that the container 13 may be filled periodically from the interior of the building. As will be apparent from Fig. 1, the end of the filler tube 15 is above the top of the container 13. The filler tube may, if desired, be otherwise disposed to be conveniently accessible to permit periodic servicing of my device. It may, for example, extend through the porch structure or through the terrace surface.

The container 13 is elongated and free of any material which might interfere with free flow of the toxic liquid through the same to ensure the distribution of the toxic substance with which it is filled through a substantial zone and is preferably kidney-shaped and has its end portions lower than its medial portion forming a reentrant angle to ensure such distribution.

In practice, several devices are employed in each area in which a wooden part of the building extends into the ground. These are spaced from each other at a distance such that a protective zone is established by the toxic substance escaping from each container through its aperture. Periodic filling of the container ensures the maintenance of the soil in such a toxic condition that termites can not live there.

From the foregoing it will be apparent that my invention makes possible inexpensive dispensers of substances toxic to termites that are easily installed and easily removed making it practical to fully safeguard buildings against termites.

What I therefore claim and desire to secure by Letters Patent is:

1. A device for supplying insecticide to soil comprising a container having its bottom forming a reentrant angle at the longitudinal center thereof, all of the sides being perforated, one or more ears secured to an upper side thereof adjacent an edge thereof, and a filling pipe extending upwardly at an inclination to one side thereof, the upper end of said pipe being at a higher level than the upper surface of the container and laterally spaced from the adjacent side thereof, said pipe being provided with a closing cap whereby the container may be attached to a side of a building structure with the ears in engagement with a wall of said structure and the filling pipe extending through and at an inclination to said wall of said structure.

2. The structure of claim 1, and portions of the container at opposite sides of said reentrant angle having a greater capacity than the intermediate portion thereof.

3. The structure of claim 1, said container being kidney shaped.

CHARLES BENJAMIN GALLANT.

REFERENCES CITED

The following references are of record in the file of this patent:

UNITED STATES PATENTS

| Number | Name | Date |
|---|---|---|
| 253,625 | Pinter | Feb. 14, 1882 |
| 321,011 | Duncan | June 30, 1885 |
| 903,452 | Cleveland | Nov. 10, 1908 |
| 1,013,514 | Rand | Jan. 2, 1912 |
| 1,133,182 | Ray | Mar. 23, 1915 |
| 1,153,123 | Lee | Sept. 7, 1915 |
| 1,296,771 | Dady | Mar. 11, 1919 |
| 1,422,831 | Camp | July 18, 1922 |
| 1,815,652 | Gring | July 21, 1931 |
| 1,877,979 | Savage | Sept. 20, 1932 |
| 1,895,009 | Sielaff | Jan. 24, 1933 |
| 2,121,406 | Purifoy | June 21, 1938 |
| 2,320,077 | Hansen | May 25, 1943 |

FOREIGN PATENTS

| Number | Country | Date |
|---|---|---|
| 423,750 | France | Feb. 23, 1911 |